United States Patent [19]

Yoshida

[11] 4,290,617
[45] Sep. 22, 1981

[54] MOTOR QUICK-CHANGE CHUCK SYSTEM FOR TOOL HAVING CYLINDRICALLY SHAPED ADAPTER PORTION WHEREIN RELATIVE LONGITUDINAL MOVEMENT BETWEEN CHUCK AND TOOL BEING DRIVEN IS ELIMINATED

[75] Inventor: Edward M. Yoshida, Bellevue, Wash.
[73] Assignee: The Boeing Company, Seattle, Wash.
[21] Appl. No.: 47,537
[22] Filed: Jun. 11, 1979
[51] Int. Cl.$^3$ .......................................... B23B 31/10
[52] U.S. Cl. ................................................. 279/75
[58] Field of Search ......................................... 279/75

[56] References Cited

U.S. PATENT DOCUMENTS

| | | | |
|---|---|---|---|
| 1,119,276 | 12/1914 | Griffith et al. | 279/75 |
| 3,633,931 | 1/1972 | Bilz | 279/75 |
| 3,652,099 | 3/1972 | Bilz | 279/75 |
| 3,658,351 | 4/1972 | Benjamin et al. | 279/75 |

FOREIGN PATENT DOCUMENTS 2740202  3/1979  Fed. Rep. of Germany ........ 279/64

Primary Examiner—Leonidas Vlachos
Attorney, Agent, or Firm—Conrad O. Gardner; Bernard A. Donahue

[57] ABSTRACT

A quick-change drill chuck adapted for positioning ball elements within a groove circumferentially disposed about the central axis of the adapter portion of the tool. Three ball elements when pressed radially into the groove prevent longitudinal movement of the adapter, the ball elements being forced toward the adapter portion of the tool by a ramp portion formed as an integral part of the inner circumferential surface of the chuck collar member.

1 Claim, 4 Drawing Figures

MOTOR QUICK-CHANGE CHUCK SYSTEM FOR TOOL HAVING CYLINDRICALLY SHAPED ADAPTER PORTION WHEREIN RELATIVE LONGITUDINAL MOVEMENT BETWEEN CHUCK AND TOOL BEING DRIVEN IS ELIMINATED

This invention relates to improvements in tool-holding chucks as shown in copending U.S. patent application Ser. No. 932,593 to Benson, et al., filed Aug. 8, 1978 and assigned to The Boeing Company.

The aforementioned Benson, et al. chuck for holding tools utilizes three balls, and six detents in the adapter portion of the tool such as a drill. Also, the Benson, et al. chuck utilizes a collar which is raised in the direction of drilling so that the drill cannot be dislodged when bumping the workpiece.

The aforementioned Benson, et al. adapter and quick-change chuck, while precise enough for low tolerance situations where a hand-held portable motor drive spindle is used, proved inadequate in precision work where a stationary drill riveter machine motor drive spindle can be used.

It is accordingly an object of the present invention to provide a tool adapter and tool adapter holding chuck assembly having a quick change feature and including means for eliminating relative longitudinal movement between chuck assembly and tool adapter being driven.

It is a further object of the present invention to provide ramping means in a collar of a chuck assembly for ramping three balls into a circumferential groove in a tool adapter.

It is another object of the present invention to provide a tool adapter having an end slot which is engaged by a pin to drive rotationally the tool adapter subsequent to ramping of three balls into a circumferential groove in the tool adapter.

The invention, together with other objects and features thereof, will be more clearly understood when the following description is read in connection with the accompanying drawings in which.

Figure 1:
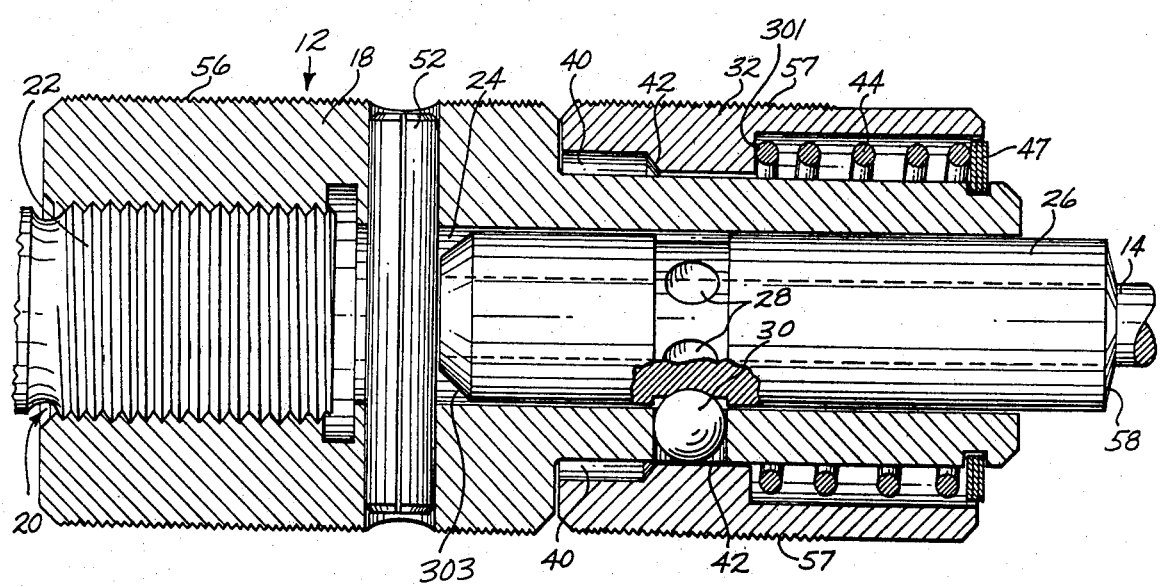
FIG. 1 is a vertical cross section of the chuck and tool shown in the above-identified Benson, et al. application.
Figure 2:
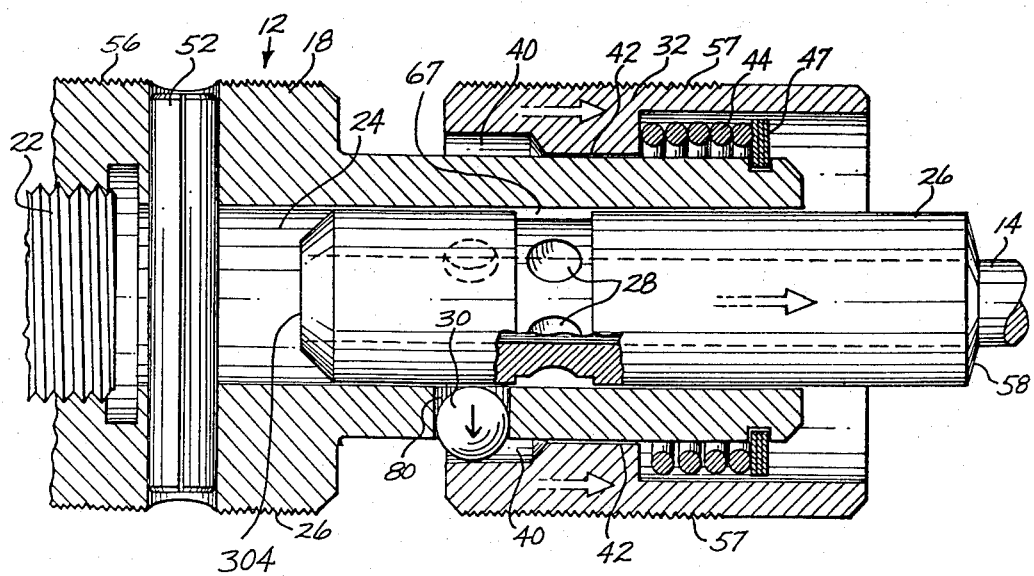
FIG. 2 is a cross section similar to FIG. 1 of the chuck and adapter portion of the tool of the above-identified Benson, et al. application showing the adapter portion being withdrawn.
Figure 3:
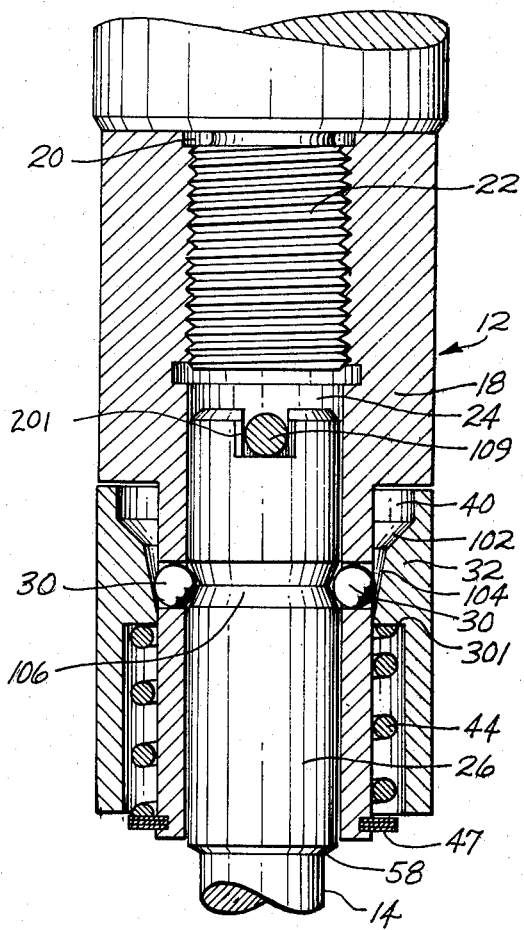
FIG. 3 is a vertical cross section of a chuck and tool in accordance with an embodiment of the present invention shown in the locked condition; and, FIG. 4 is a cross section similar to FIG. 3 of the chuck and adapter portion of the tool in accordance with an embodiment of the present invention showing the released condition and the adapter portion being withdrawn.
Figure 4:
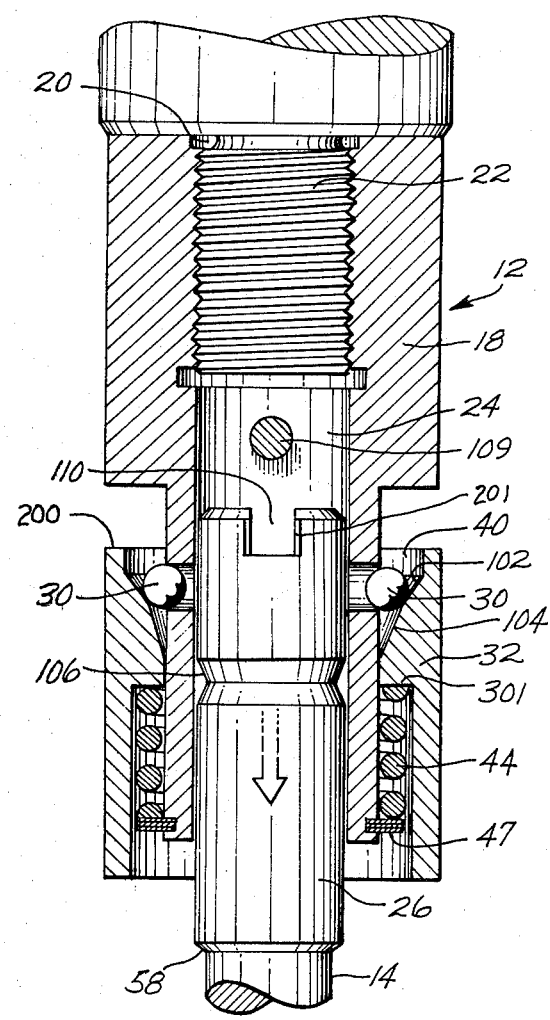

FIGS. 1 and 2 are included herein so that the features and advantages of the present invention shown and described in FIGS. 3 and 4 can be easily distinguished and compared with those shown in Benson, et al. Turning now to FIGS. 1 and 2 which correspond to FIGS. 2 and 4 of Benson, et al. it will be noted that a chuck 12 is provided for retaining and driving a tool, via., a drill bit 14 having an adapter portion 26 concentrically disposed within chuck 12.

Chuck 12 comprises a generally cylindrically shaped body member 18 having a hollow first end portion 20. Concentrically disposed hollow first end portion 20 is threaded on the inner wall surface thereof to accept the mating threaded spindle 22 of a motor (not shown).

Hollow first end portion 20 is concentric with hollow end portion 24 at the other end of cylindrically shaped body member 18 of chuck 12 which accepts adapter portion 26 of tool 14, thereby minimizing tool 14 run-out tendencies. It should be noted that cylindrically shaped adapter portion 26 includes six (6) spherically shaped dimples 28 equiangularly disposed about the central axis of tool 14 around the outer surface of adapter portion 26. Also it should be further noted that three balls 30 are controlled by chuck collar member 32 and locked in dimples 28 to permit tool 14 retention, or withdrawn from dimples 28 (as seen in FIG. 2) to permit tool 14 withdrawal.

In the chuck embodiment of FIGS. 1 and 2, balls 30 are disengaged for removing adapter portion 26 of tool 14 by raising spring-loaded collar member 32 of chuck 12, thereby permitting balls 30 to move outward radially (with respect to the chuck 12 central axis) into recesses 40 formed in the inner wall surface of collar member 32 adjacent radially extending shoulder portion 42 utilized to lock balls 30 in dimples 28. When collar member 32 is released, axially biasing spirally wound spring member 44 preloaded in position by retaining ring 47 will drive collar member 32 downward when dimples 28 in adapter portion 26 are aligned with balls 30 of chuck 12, thereby trapping balls 30 in dimples 28 of adapter portion 26. It will be noted from FIG. 2 that collar member 32 must be moved towards the workpiece beyond the end of tool 14 for tool removal, thus accidental disengagement, which might occur when the workpiece is contacted, is prevented.

When adapter portion 26 is installed by insertion into chuck 12 within body member 18, proper depth for engagement is realized upon contact with roll pin depth stop 52. Adapter portion 26 is formed of hardened steel, e.g., 1020 steel case-hardened, 1095 through-hardened, to minimize dimple 28 brinelling and also for the purpose of minimizing damage to the outside diameter thereof that might occur in handling or storage. A slip fit is provided between the outside diameter of adapter portion 26 and the inner bore 24 diameter, e.g., 0.0005 to 0.0015 inches clearance between these surfaces. Cylindrically shaped body member 18 has an outer knurled surface 56, thereby providing sufficient roughening to allow hand rotation of body member 18 to free tool 14 in the event of hanging-up of tool 14 in the workpiece. Collar member 32 is also provided with a knurled outer surface 57 rearward of the workpiece. However, it is left smooth at the forward region to minimize damage to the workpiece that might occur upon work contact. Adapter portion 26 has the front surface 58 thereof beveled to prevent work damage in the event of contact therewith. A circumferential recess 67 is provided in adapter portion 26 surrounding dimples 28 to clear debris and permit some deformation of the dimples without preventing insertion in the chuck.

Installation and removal of adapter 26 is accomplished in the following manner: Collar 32 is gripped at knurled portion 57 and raised, thus allowing the three balls 30 to be disengaged from the adapter detents 28 by moving outward radially into the collar recess 40. Tool 14 and adapter 26 are now free for removal of adapter 26. During installation adapter 26 is pushed into the bore 24 with the collar 32 still raised, until roll pin depth stop 52 is reached. Now collar 32 is released and compression spring 44 will automatically snap the collar 32 closed and trap the balls 30 between surface 42 and detents 28 upon rotation of adapter 26 to align detents 28 with ball sockets 80.

Turning now to FIGS. 3 and 4 showing a tool-holding chuck assembly 12 and tool having a cylindrically shaped adapter portion 26 in accordance with an embodiment of the present invention, and wherein the same numerals are utilized to identify parts corresponding to those hereinbefore shown and discussed in reference to FIGS. 1 and 2, it will be observed that cylindrically shaped adapter portion 26 includes a circumferentially disposed groove 106 having a V-shaped cross section. Balls 30, when pressed radially into circumferentially disposed groove 106, prevent cylindrically shaped adapter portion 26 from moving longitudinally. Three circumferentially disposed balls 30 are forced (from the released position of FIG. 4) toward cylindrically shaped adapter portion 26 by second ramp surface portion 104 of the inner surface of spring-loaded collar member 32 of chuck 12 and pressed into circumferentially disposed groove 106 to a locked position as shown in FIG. 3. The rear flat face 200 of collar 32 is machined so as not to allow face 200 to contact body 18. This permits ramp 104 to positively press balls 30 into groove 106. While second ramp surface portion 104 (inclined with a slope of about 5 degrees with respect to the central axis of collar member 32) provides sufficient mechanical advantage when driven by compressed helical spring 44 to force balls 30 into circumferentially disposed groove 106, first ramp surface portion 102 of collar member 32 (which is inclined with a slope of about 45 degrees with respect to the central axis of collar member 32) allows balls 30 to be retained outside the region of groove 106 prior to final forceful locking by second ramp surface portion 104. Collar member 32 is preloaded in position by spirally wound spring member 44 and held in position by retaining ring 47 in the manner described earlier with reference to FIGS. 1 and 2. Tool 14 (shank end of the drill only shown) is installed and removed by movement of collar member 32 in the direction of tool 14 (as seen in FIG. 4) which compresses spring 44 which is spirally wound in the form of a helix thereby allowing balls 30 to move radially outward and releasing cylindrically shaped adapter portion 26. Tool 14 is driven rotationally by pin member 109 which fits into slot 110 in the end portion of cylindrically shaped adapter portion 26. The ends of slot 110 parallel to the central axis of adapter 26 have a chamfer 201 to allow some deformation of slot 110 without hindering removal of adapter 26 from inner bore 24. Pin member 109 is mounted in a fixed position perpendicular to the central axis of chuck 12 within cylindrically shaped body member 18 while slot 110 of rectangular cross section is perpendicular to and intersects the central axis of cylindrically shaped adapter portion 26.

In the released position, helical spring 44 is held compressed. In the locked position, as shown in FIG. 3, chuck collar member 32 is free to move and helical spring 44 has pressed second ramp portion 104 against balls 30 forcing them into groove 106 and further causing positioning of pin member 109 into transversely disposed slot 110 thereby locking drill 14 and preventing any longitudinal drill movement.

I claim:
1. In combination:
   a tool having cylindrically shaped adapter portion (26);
   a tool-holding chuck assembly having a generally cylindrically shaped body member, said generally cylindrically shaped body member having a hollow first end portion, said hollow first end portion having an inner wall surface threaded to accept the mating threaded spindle of a stationary motor, said generally cylindrically shaped body member having a hollow second end portion concentrically disposed relative to said hollow first end portion for receiving said cylindrically shaped adapter portion in slip fit relationship therewith, said cylindrically shaped adapter portion having a transversely disposed slot (110) at one end thereof, said generally cylindrically shaped body member including a drive pin (109) disposed between said hollow first end portion and said hollow second end portion for engaging said transversely disposed slot (110) in said received cylindrically shaped adapter portion (26) and rotationally driving said tool, said drive pin (109) when also engaging said transversely disposed slop (110) further functioning to provide locking of said tool and preventing longitudinal movement;
   said cylindrically shaped tool adapter portion including a groove circumferentially disposed in the outer surface of said cylindrically shaped adapter portion;
   said tool-holding chuck assembly including three shperically shaped ball elements, a collar member (32) having an internal shoulder (301), a recess (40) and first (102) and second (104) ramp surface portions formed in the inner wall surface thereof, said second ramp surface portion (104) inclined with a slope of about five degrees with respect to the central axis of said collar member (32), a retaining ring (47), a spirally wound spring member (44) disposed between said retaining ring (47) and said internal shoulder (301), said collar member (32), retaining ring (47), and spirally wound spring member (44) coaxially disposed about the central axis, said collar member (32) adapted to be moved axially for compressing spirally wound spring member (44) between said retaining ring (47) and said internal shoulder (301) thereby positioning said recess (40) and first ramp surface portion 102 for receiving said three cylindrically shaped ball elements to provide release of said cylindrically shaped adapter portion of said tool from said tool holding chuck assembly.

\* \* \* \* \*